US012799308B2

(12) United States Patent
Soibel et al.

(10) Patent No.: US 12,799,308 B2
(45) **Date of Patent: *Nov. 17, 2026**

(54) RENEWABLY-SOURCED BIODEGRADABLE POLYOLEFIN PACKAGING, UTENSILS, AND CONTAINERS

(71) Applicant: ENLIGHTENED PRODUCT SOLUTIONS, LLC, Miramar, FL (US)

(72) Inventors: Randy Soibel, Deerfield, IL (US); Robert L. Tammara, Miramar, FL (US)

(73) Assignee: ENLIGHTENED PRODUCT SOLUTIONS, LLC, Miramar, FL (US)

( * ) Notice: Subject to any disclaimer, the term of this patent is extended or adjusted under 35 U.S.C. 154(b) by 170 days.

This patent is subject to a terminal disclaimer.

(21) Appl. No.: 18/406,215

(22) Filed: Jan. 8, 2024

(65) Prior Publication Data

US 2024/0368389 A1 Nov. 7, 2024

Related U.S. Application Data

(60) Division of application No. 17/449,388, filed on Sep. 29, 2021, now Pat. No. 11,905,396, which is a continuation-in-part of application No. 17/060,058, filed on Sep. 30, 2020, now Pat. No. 12,466,939.

(60) Provisional application No. 62/907,959, filed on Sep. 30, 2019.

(51) Int. Cl.

| | |
|---|---|
| ***C08L 23/06*** | (2006.01) |
| ***A47G 19/02*** | (2006.01) |
| ***A47G 21/02*** | (2006.01) |
| ***A47G 21/04*** | (2006.01) |
| ***C08J 3/20*** | (2006.01) |
| ***C08K 5/00*** | (2006.01) |
| ***C08L 23/12*** | (2006.01) |

(52) U.S. Cl.
CPC ............... *C08L 23/06* (2013.01); *C08J 3/203* (2013.01); *C08K 5/0033* (2013.01); *C08L 23/12* (2013.01); *A47G 19/02* (2013.01); *A47G 21/023* (2013.01); *A47G 21/04* (2013.01); *C08L 2201/06* (2013.01); *C08L 2203/10* (2013.01); *C08L 2203/30* (2013.01)

(58) Field of Classification Search
None
See application file for complete search history.

(56) References Cited

U.S. PATENT DOCUMENTS

| | | | | |
|---|---|---|---|---|
| 2009/0078125 A1* | 3/2009 | Pawlick | ............ | B65D 81/3438 99/449 |
| 2017/0058101 A1* | 3/2017 | Haley | ................... | B32B 27/065 |

* cited by examiner

*Primary Examiner* — Robert T Butcher
(74) *Attorney, Agent, or Firm* — Pearson IP; Loren Donald Pearson

(57) ABSTRACT

Renewably-sourced biodegradable polyolefin packaging, utensils, and containers include a renewably-sourced polyolefin (for example, polyethylene and polypropylene) and a biodegrading agent. The renewably-sourced biodegradable polyolefin packaging is made from plant materials typically by polymerizing olefins that are made from reducing alcohols created by fermenting plant materials. An example of a suitable plant material is sugarcane and its derivatives. The biodegrading agent accelerates the biodegradation of polyolefin packaging even in anaerobic and dark (i.e., absent of ultraviolet light) environments. Such a packaging is particularly useful for packaging frozen food that is to be microwaved in the packaging. The package is also particularly usable as packaging for frozen comestibles, which are often stored at dry-ice temperatures. Ultimately, the renewably-sourced biodegradable polyolefin packaging provides a start-to-finish green packaging that meets the requirements of being renewably sourced, biodegradable in landfills, and having similar performance as traditional polyolefin packaging.

6 Claims, 8 Drawing Sheets

RENEWABLY-SOURCED BIODEGRADABLE POLYOLEFIN PACKAGING, UTENSILS, AND CONTAINERS

CROSS-REFERENCE TO RELATED APPLICATIONS

This is a divisional application of application Ser. No. 17/449,388, filed Sep. 29, 2021, which is a continuation-in-part application of application Ser. No. 17/060,058, filed Sep. 30, 2020, which claims the benefit of U.S. Provisional Application No. 62/907,959, filed Sep. 30, 2019, all of which are hereby incorporated by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to renewably-sourced and biodegradable packaging and, more specifically, to polyolefin packaging.

Description of the Related Art

Packaging for cold environments or for cold goods can perform by holding the product while not deteriorating, delaminating, or becoming brittle at the anticipated temperature. For packaging that will be exposed to dry ice, the packaging can perform at −78.5° C. For packaging that will be used with food that is blast frozen, the packaging can perform at −40° C. For packaging that will be used with a conventional freezer, the packaging can perform at −18° C.

Packaging that is to be used with frozen comestibles, particularly, dairy based frozen comestibles, the packaging can perform at room temperature (i.e., 25° C.) even when exposed to liquid (i.e., melted) food. For example, the packaging preferably cannot absorb liquid or become fragile or saggy when exposed to liquid.

Packaging for ice cream and gelato is made from nonrenewable and/or nonrecyclable materials. The most common materials for packaging are closed cell extruded polystyrene foam (XPS), stainless steel, and polymer treated cardboard. XPS is a petroleum-based product, which is a nonrenewable material. Stainless steel is made with iron, which is a nonrenewable material. Polyethylene treated carboard is not renewable because polyethylene is petroleum based and, therefore, is a nonrenewable material. An additional problem with polyethylene coated cardboard is that the polyethylene cannot be economically separated from the cardboard. As a result, the entirety of the coated paper becomes nonrecyclable.

Packaging to be used with heated products is made with nonrenewable materials. Pawlick et al., U.S. Pat. No. 8,302,528, describes a "Cooking Method and Apparatus." At column 9, lines 13-15, Pawick et al. states, "The containers 22, 122 and baskets 24, 24', 124, 124', 124" may be made of polymers, such as Polypropylene (PP) (e.g., Co-polymer Polypropylene), Crystallized Polyethylene Terephthalate (CPET), or any other microwave and food safe non-toxic material."

Packaging to be used with heated food products can perform at 104° C. Packaging to be used with steam heat food products can perform at a temperature slightly above boiling (>100° C.), for example 104° C.

Retailers of frozen comestibles are facing pressures to reduce the consumption and disposal of petroleum-based and metallic materials. The pressure comes in many forms. Regulations limit or impose taxes on the amount of petroleum-based and metallic products disposed by the retailer. The purchase cost of petroleum-based and metallic products is rising. Finally, customers see decreased value in products packaged with petroleum-based or metallic materials.

Plastics are materials formed by polymers and additives, characterized by high molecular weight. Their versatility makes them an essential material in different application; they are used in packaging (39.9%), construction (19.8%), the automotive industry (9.8%), electronics and communications (6.2%), agriculture (3.4%), household leisure and sport (4.1%), and other fields (16.7%). Among the different plastics, the most used in packaging are polypropylene (PP), low-density polyethylene (LDPE), high-density polyethylene (HDPE), vinyl chloride (PVC), polyurethane (PU), polyethylene terephthalate (PETE), and polystyrene (PS). Most plastics are durable and resistant to degradation; this is the feature that makes them very attractive for many applications. However, these characteristics have adverse effects once plastic products are discarded. In 2015, 6300 Mt of plastic was produced; 9% was recycled, 12% was incinerated, and 79% was landfilled or littered in the environment.

The vast majority of polyolefins including polyethylene and polypropylene is made from non-renewable sources. The non-renewable sources used to form most polyolefins include petroleum, naphtha, and natural gas.

A line of renewably-sourced polyethylene and polypropylene by Braskem S. A. are sold under the trademark I'M GREEN®.

Manufacturers have adopted packaging made of polyolefins because they are low cost and durable.

An unintended consequence of polyolefins' durability is its extremely slow biodegradation.

Biodegrading agents are additives to be mixed with polyolefin starting materials (i.e., pelletized polyolefins) to increase the biodegradability of polyolefins without reducing the performance and attributes of the polyolefin. Biodegrading agents are sold under the trademark BIOSPHERE®. Biodegrading agents are sold under the trade name ECM MASTERBATCH PELLETS.

One way to measure the biodegradability of packaging is standardized in ASTM D5511.

BRIEF SUMMARY OF THE INVENTION

With the foregoing and other objects in view there is provided, in accordance with the invention, renewably-sourced biodegradable polyolefin packaging.

Renewably-Sourced Polyolefins

A method for making renewably-sourced polyolefins is taught in Morschbaker, U.S. Pat. No. 8,835,703, titled, "Method for the Production of One or More Olefins, an Olefin, and a Polymer," which is hereby incorporated by reference.

The method begins with natural agricultural raw materials. The natural agricultural raw materials originate from sugarcane bagasse, sugarcane straw, corn straw, corn cobs, and sorghum straw. Optionally, the natural agricultural raw materials can include residues of other agricultural crops, urban or industrial residues, as well as residues originating from fishing, animal breeding, or mining activities, such as, among others, beet, manioc, wheat, rice straw, peanut shells, coconut shells, wood kindling, wood chips, sawdust, charcoal, wax palm leaves, babassu palm residues, various types of grasses, leaves, and branches of some plants, residues of the process of production of vegetable oils, such as filter cakes obtained from the production oils of soy, of castor beans and plants, and of other oleaginous plants, recycled vegetable oils, animal fats, algae, recycled paper and paperboard, lignin and other residues from the paper and pulp industry originating from crops such as *eucalyptus* and pine, garbage, biogas derived from fermentation, glycerol, or residues containing glycerol, shellfish shells or bird feathers. The common trait among these renewable natural raw materials is that they are simultaneously rich in starch and/or sugar and in lignocellulosic materials.

In the next step of the method, the renewable natural raw materials are fermented to form ethanol. Various processes for fermenting particular raw materials can be applied. For example, sugarcane can be fermented using *Saccharomyces cerevisiae* yeast to produce ethanol and carbon dioxide.

In the next step, ethylene is produced through dehydration of ethanol. Processes for dehydrating alcohols to form ethylene are described in the following documents, which are hereby incorporated by reference: "Ethylene from Ethanol," Scheeline et al., *PEP Review* 79-3-4, January 1980; U.S. Pat. Nos. 4,232,179; 4,234,752; 4,396,789, 4,529,827, and international patent application WO 2004/078336. A process to produce olefins from the dehydration of one or more light alcohols, using ionic liquids is described in do Carmo et al., U.S. Pat. No. 9,181,143, which is hereby incorporated by reference.

An alternate or additional step includes generating synthesis gas by using a biomass gasification process. The synthesis gas is used to produce methanol. In turn, the methanol is used for the formation of propylene, directly or indirectly from the intermediate dimethyl ether, as described in the following patents: U.S. Pat. No. 4,929,780, EP 448000, and U.S. Pat. No. 6,534,692.

The next step is transforming methanol and/or dimethyl ether into propylene, ethylene, and butylene.

The next step is to transform propylene, ethylene, and butylene to form renewably-sourced polypropylene and its copolymers, polyethylene and its copolymers.

Biodegrading Agents

Biodegrading agents, which are also referred to as biodegradable additives, enhance the biodegradation of plastic by adding hydrophilic parameters to the polymer chain. The hydrophilic parameters allow microbial enzymatic action to reduce the structure of the polymer by utilizing macromolecules within the plastic polymer. The inclusion of biodegrading agents should not change the physical properties of the plastic. The macromolecules are consumable by microbes. The consumption of the macromolecules by the microbes creates breaks in the chains of polyolefins and results in the degradation of the polyolefin.

The biodegrading agent should be mixed throughout the polyolefin. Microbes will breakdown carbon to carbon bonds that involve the biodegrading agent even when the biodegrading agent is spread throughout the polyolefin, including within the polyolefin. The consumption of the biodegrading agent increases the exposed surface area of the now-pitted polyolefin. Plastophillic microbes can attach themselves with pores of the polymer and are not limited to attaching to the surface of the polyolefin.

The biodegrading agent is hydrophilic. The addition of the biodegrading agent makes the mixture more hydrophilic. Increasing the hydrophilicity of the mixture increases the biodegradation.

The biodegrading agent increases the biodegradability of the polyolefin by increasing hydrolysis, acidogenesis, acetogenesis, and methanogenesis.

Another type of biodegrading agent is a pro-oxidant additive. Pro-oxidant additives increase the rate of both thermo-oxidation and photo-oxidation, resulting in a larger amount of low molecular extractable compounds. Microbial strains can then efficiently attack the carbon in these low molecular weight fragments of the large chain polymers.

Pro-oxidant additives are commonly used to enhance the rate of biodegradation of ethylene and polyethylene. High-molecular-weight polyethylene hinders the ability of microorganisms to naturally degrade the materials. Pro-oxidant additives have been effective in increasing the biodegradability of polyethylene by creating smaller fragments of the polymer.

Typical pro-oxidant additives are the transition metal complexes or transient metal ions, which are added to the plastic in the form of stearate or other organic ligand complexes. The most common materials used as pro-oxidants are iron, manganese, and cobalt. Iron complexes increase the rate of photooxidation by providing a source or radicals for the initiation step in the process of creating smaller molecular weight fragments.

An object of the invention is to provide a method for making renewably-sourced biodegradable polyolefins. The method begins with providing renewably-sourced polyolefins, which typically, but not necessarily, are pelletized. To the polyolefins, the biodegradable agent is mixed and melted to form a resin mixture. Next, the molten resin mixture is shaped to the desired packaging shape. Injection molding can be used to shape the molten resin into the package shape, for example, a bottle-shape. The biodegradable agent works in anaerobic conditions and does not require ultraviolet light to increase the biodegradation of the resin.

A further object of the invention is to provide renewably-sourced biodegradable packaging that is biodegradable. The packaging can include renewably-sourced biodegradable polyolefins and a biodegradable agent. Examples of suitable biodegrading agents are sold under the trademark BIOSPHERE® PLASTIC ADDITIVE. The polyolefin/biodegradable-agent mixture is from ninety-eight to ninety-nine-and-five-tenths percent (98-99.5%) by weight polyolefin and five-tenths to two percent (0.5-2%) by weight biodegradable agent.

In accordance with the objects of the invention, renewably-sourced biodegradable polyolefin packaging is provided. The renewably-sourced biodegradable polyolefin includes a renewably-sourced polyolefin and a biodegrading agent mixed with said renewably-sourced polyolefin. The biodegrading agent increases biodegradation of the renewably-sourced polyolefin. Examples of renewably-sourced biodegradable polyolefin are renewably-sourced polyethylene and renewably-sourced polypropylene. The biodegrading agent forms an effective amount of the renewably-sourced-polyolefin/biodegrading-agent mixture. The effective amount of the biodegradable agent in the of the renewably-sourced-polyolefin/biodegrading-agent mixture usually ranges 0.5% to 2.0% by weight.

The biodegrading agent anaerobically biodegrades the renewably-sourced polyolefin without using ultraviolet light.

In accordance with the objects of the invention, a method for manufacturing renewably-sourced biodegradable polyolefin packaging is provided. The first step is providing renewably-sourced polyolefin. The next step is admixing a biodegrading agent with the renewably-sourced polyolefin to produce a resin mixture. The biodegrading agent increases biodegradation of the renewably-sourced polyolefin. The next step is melting the resin mixture to form a molten resin mixture. The next step is molding the molten resin mixture into packaging.

In accordance with the objects of the invention, a method for forming renewably-sourced polyolefin is provided. The renewably-sourced polyolefin is made by transforming renewably-sourced light alcohols into olefins and polymerizing the olefins into the renewably-sourced polyolefin. The light alcohols can be sourced from plant material. In particular, the plant material can include sugarcane and sugarcane derivatives.

The invention includes a method for using renewably-sourced biodegradable polyolefin packaging. The method for using includes biodegrading the packaging. The biodegrading occurs anaerobically and without ultraviolet light, for example while buried in a landfill.

The invention includes a method of packaging food. The method begins with the step of placing food within a renewably-sourced biodegradable polyolefin package. The renewably-sourced biodegradable package includes renewably-sourced polyolefin and a biodegrading agent mixed with the renewably-sourced polyolefin. In the case of frozen food, the next step is storing the packaging and said food at a temperature below zero degrees Celsius (<0° C.). In the case of packaging that is to be used when reheating by microwave, the method includes microwaving the packaging and the food.

The renewably-sourced biodegradable packaging is particularly useful for packaging frozen comestibles, such as ice cream and gelato. The renewably-sourced biodegradable packaging can be used to from an ice create carton. To package gelato, a gelato tray is provided. The gelato tray includes a front wall, a right wall connected to the front wall, a rear wall connected to the right wall, a left wall connected to the rear wall and the front wall, a bottom connected to the front wall (the right wall, the rear wall; and the left wall), and a rim connected to and extending outward from the front wall, the right wall, the rear wall, and the left wall. The front wall, the right wall, the rear wall, the left wall, the bottom, and the rim are made of renewably-sourced biodegradable polyolefin, the renewably-sourced biodegradable polyolefin.

In accordance with the objects of the invention, a renewably-sourced biodegradable polyolefin utensil is provided. The utensil includes a resin being made from a polymerized mixture of a renewably-sourced polyolefin and a biodegrading agent.

The renewably-sourced biodegradable polyolefin utensil can include a tool and handle. The tool can be used for contacting food. The handle can be used by a user to grip. The handle is connected to the tool. At least one of the tool and the handle including said resin. The tool can be a knife blade; a fork having a root and at least two tines; a spoon having a bowl; a spork having a bowl and at least two tines, each of said two tines being connected to said bowl; and a stick for contacting food.

In accordance with the objects of invention a renewably-sourced biodegradable polyolefin container is provided. The container, which is also referred to as a vessel, is for holding food. The container includes a resin made from a polymerized mixture of a renewably-sourced polyolefin and a biodegrading agent.

The renewably-sourced biodegradable polyolefin container can be a plate, a bowl, a tray. a pitcher, a cup, a bottle, or a sports bottle. The plate has a well surface for supporting food and a base for contacting a tabletop. The bowl has a concave wall for supporting food and a base for contacting a tabletop. The tray having a flat top for supporting a further container, a base for contacting a tabletop, and a rim around the flat top for preventing spills from leaving the tray. The pitcher includes a bowl for storing a liquid, a spout for pouring a liquid from the bowl, and a handle connected to the bowl for lifting and tilting the bowl. The bowl stores a liquid and has a base for contacting a table. The sport bottle has a bowl for storing a liquid and a neck with a mouth; the neck is connected to the bowl and is narrower than the bowl; and the mouth allows liquids to be added to the bowl or removed from the bowl. The bottle can include a cap that is removably connected to the neck and that closes the mouth. In a sports bottle, the bowl is flexible and the cap has a nozzle for ejecting the liquid therethrough when the bowl is squeezed.

In accordance with the objects of the invention, a method for forming a renewably-sourced biodegradable polyolefin utensil is provided. The method includes the following steps. The first step is melting a mixture of renewably-sourced polyolefin and biodegrading agent to form a molten resin. The next step is molding said molten resin to a shape of a utensil.

In a step before the melting step, the following step can be performed: mixing pelletized renewably-sourced polyolefin and pelletized biodegrading agent to form the mixture.

In accordance with the objects of the invention, a method for forming a renewably-sourced biodegradable polyolefin container is provided. The method includes the following steps. The first step is melting a mixture of renewably-sourced polyolefin and biodegrading agent to form a molten resin. The next step is molding said molten resin to a shape of a container.

In a step before the melting step, the following step can be performed: mixing pelletized renewably-sourced polyolefin and pelletized biodegrading agent to form the mixture.

Other features that are considered as characteristic for the invention are set forth in the appended claims.

Although the invention is illustrated and described herein as embodied in renewably-sourced biodegradable polyolefin, the invention should not be limited to the details shown in those embodiments because various modifications and structural changes may be made without departing from the spirit of the invention while remaining within the scope and range of equivalents of the claims.

The construction and method of operation of the invention and additional objects and advantages of the invention is best understood from the following description of specific embodiments when read in connection with the accompanying drawings.

DETAILED DESCRIPTION OF THE INVENTION

Figure 1:
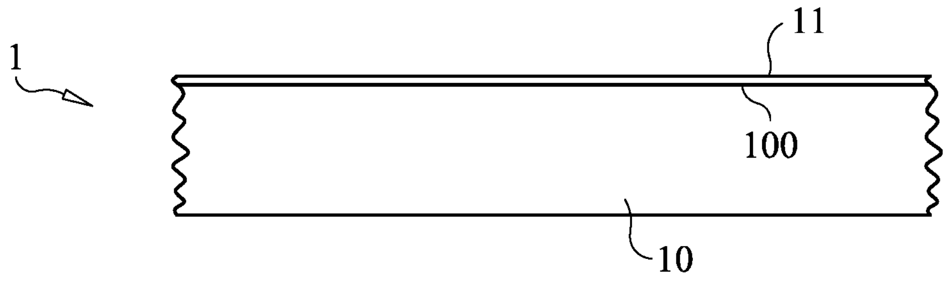
FIG. 1 is a sectional view of a laminate according to the invention.

Embodiments of the invention are described below and are shown in the figures of the drawing.

Renewably-Sourced Biodegradable Polyethylene Packaging

A preferred embodiment of the invention is renewably-sourced biodegradable polyethylene packaging. The packaging is formed with a mixture of ninety-eight to ninety-nine-and-five-tenths percent (98-99.5%) by weight of renewably-sourced polyethylene and five-tenths to two percent (0.5-2%) by weight of biodegrading agent. The renewably-sourced polyethylene is produced by polymerizing ethylene, where the ethylene is produced by reducing light alcohols sourced from fermented sugarcane. The preferred biodegrading agent is the biodegrading agent sold under the trademark BIOSPHERE® PLASTIC ADDITIVE.

Laminate

FIG. 1 is a first preferred embodiment of a laminate 1 for making food containers. The laminate 1 includes a base layer 10 and a coating 11. The base layer 10 is made from a renewable or sustainable material. The coating 11 is adhered to a surface 100 of the base layer 10 that will be facing the interior of the container when folded into the container. The base layer 10 has a thickness of 0.050 cm.

FIG. 1 also shows a second preferred embodiment of a laminate 1 for making packaging. The laminate 1 includes a base layer 10 and a coating 11. The base layer 10 is made from a renewable or sustainable material. Examples of renewable or sustainable materials include paper, cardboard, polylactic acid, and bamboo-sourced stock. The coating 11 is adhered to a surface 100 of the base layer 10 that will be facing the interior of the container when folded into the container. The base layer 10 has a thickness of 0.050 cm. The coating 11 is made from a film of renewably-sourced biodegradable polyolefin.

Figure 2:
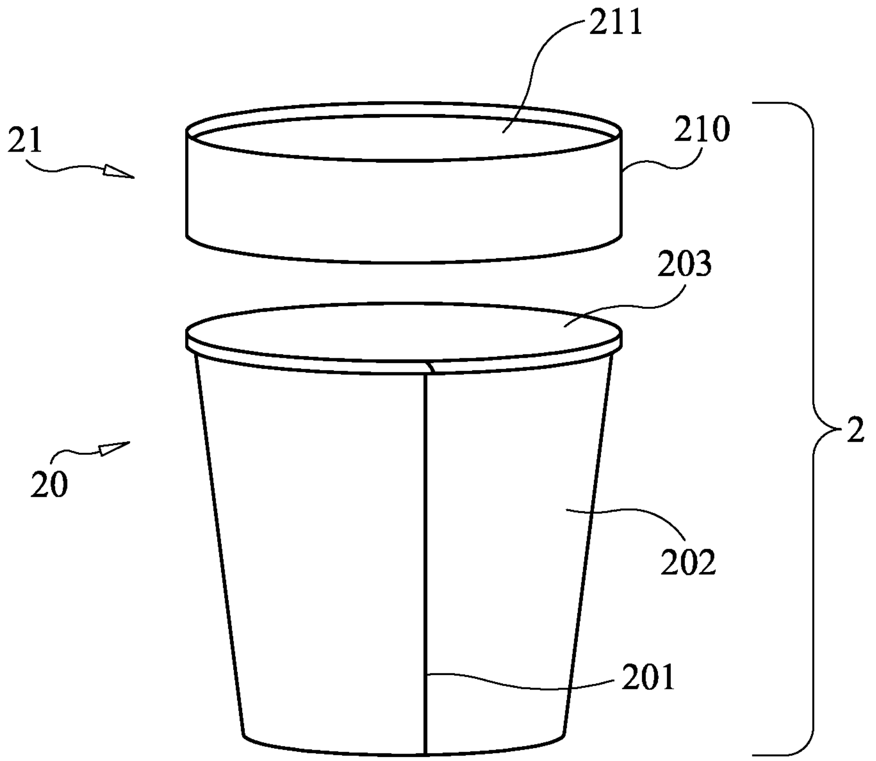
FIG. 2 is a perspective view of an ice-cream container according to the invention.

FIG. 2 shows a preferred embodiment of a container 2. In this embodiment, the container 2 is intended to be used to hold food and used once (i.e., single use). The container 2 is made from the laminate 1. The container 2 includes a carton 20 and a lid 21. The carton 20 has a wall 202 that is folded onto itself to form a seam 201. The carton 20 has a rim 204. The inside surface 203 of the wall 202 is covered with the coating 11. The lid 21 is made of the laminate 1 and has a wall 210 and a top 211.

Figure 3:
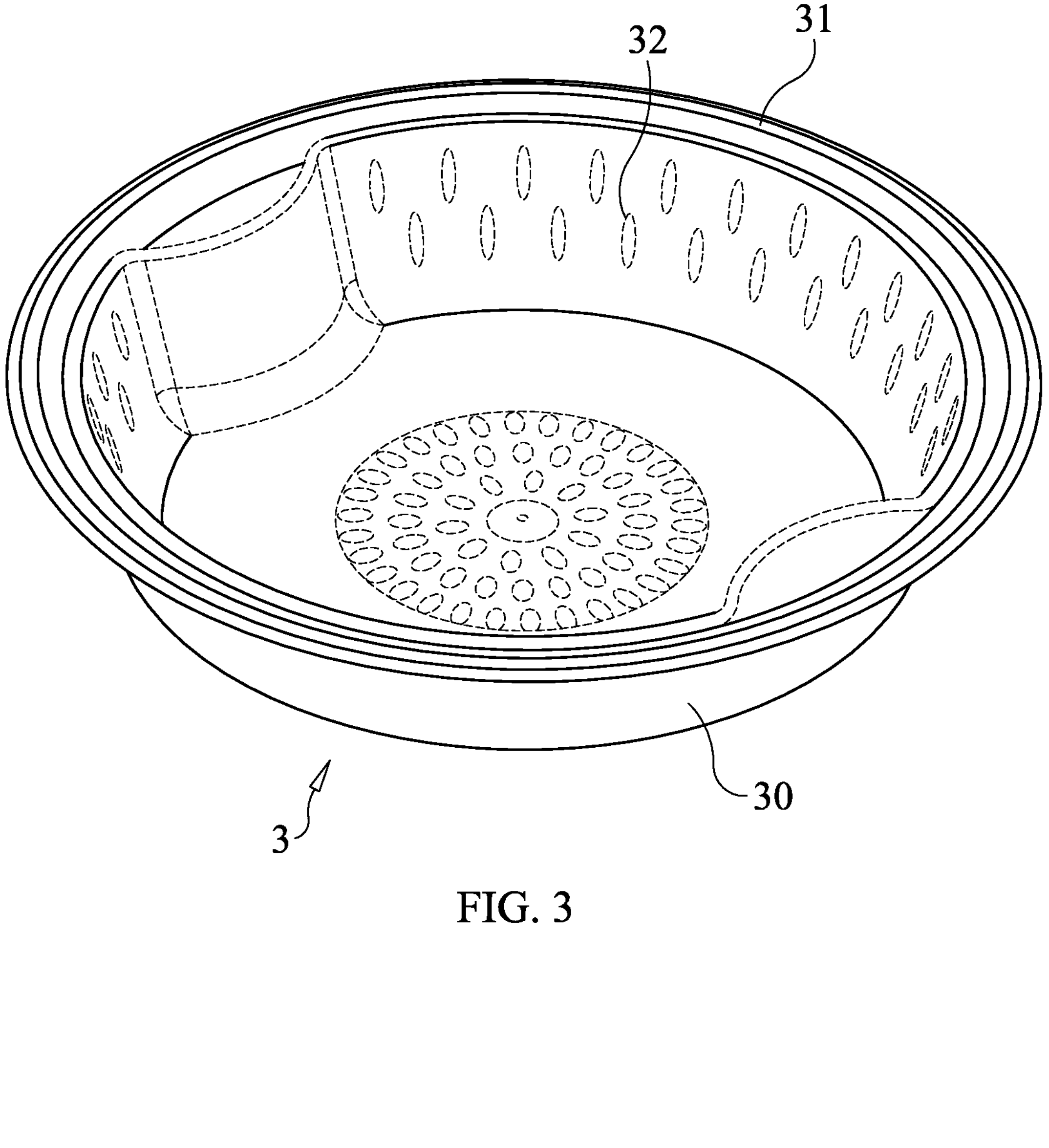
FIG. 3 is a perspective view of a steaming tray according to the invention.

FIG. 3 shows a preferred embodiment of packaging: a steaming tray 3. The steaming tray 3 includes a cover 30. The cover 30 has a rim 31 around its periphery. The cover 30 has perforations 32 formed therein. In a first preferred embodiment, the steaming tray 3 is made of the laminate 1 in which the base layer 10 is made from a renewable or sustainable material. In a second preferred embodiment, the steaming tray 3 is made of the laminate 1 in which the base layer 10 is made of a renewably-sourced biodegradable polyolefin. In a third preferred embodiment, the steaming tray 3 is made of renewably-sourced biodegradable polyolefin. Two suitable examples of the polyolefin are polyethylene and polypropylene. The third embodiment is made by injection molding the renewably-sourced biodegradable polyolefin into the shape of the steaming tray 3.

Preferred methods of using the steaming tray 3 include combinations of at least one of the following steps. One step is placing food within a container that includes the steaming tray 3. The next step is freezing the food by cooling the container that includes the steaming tray 3 to a temperature below freezing (i.e., <0° C.). If the food is to be blast frozen, then the next step is to freeze by cooling the food and the container that includes the steaming tray 3 to a temperature equal to or less than negative forty degrees Celsius (≤−40° C.). If the food is to be stored and cooled with dry ice, then the next step is to freeze the food and the packaging that includes the steaming tray 3 to negative seventy-eight or lower degrees Celsius (≤−78° C.). Once in its desired frozen state, the food and the container that includes the steaming tray 3 are stored, shipped, and distributed. In the next step, a retailer sells the food and the container that includes the steaming tray 3 at a temperature below freezing (<0° C.). The purchaser/consumer/end user keeps the frozen food held in the container that includes the steaming tray in a freezer at a temperature below freezing (<0° C.). When the food preparer or end user is ready to eat the frozen food, the container that holds the frozen food along with the steaming tray 3 is heated in a microwave. The steaming tray 3 is exposed to steam which is at the temperatures equal to the boiling point of water (i.e., 100° C.). The next is to uncover the now cooked food by removing the steaming tray 3.

Figure 4:
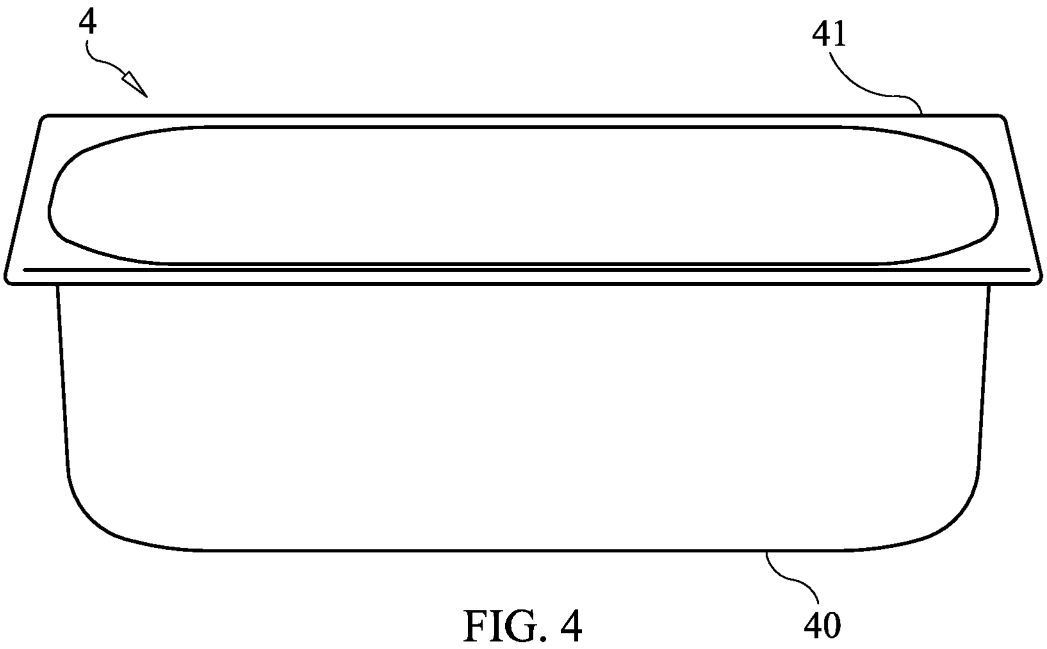
FIG. 4 is a perspective view of a gelato tray according to the invention.
Figure 5:
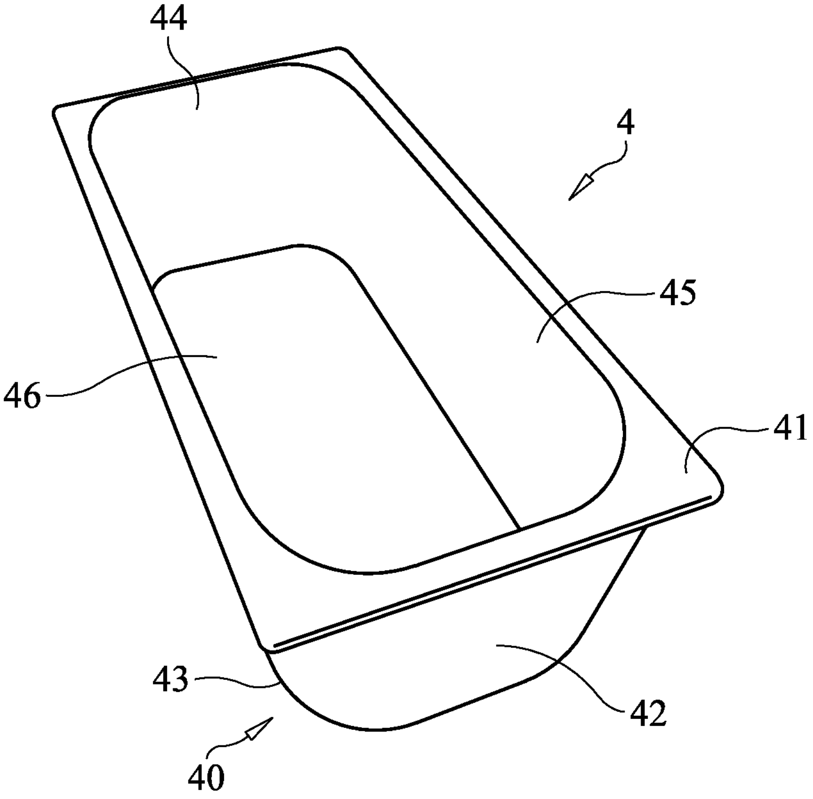
FIG. 5 is a perspective view of the gelato tray shown in FIG. 4.

FIGS. 4-5 shows a gelato tray 4. The gelato tray 4 includes a rounded cuboid container 40 an opening at a top of the rounded cuboid container 40 and a rim 41 extending peripherally from a top edge of the rounded cuboid container 40. While FIGS. 4-5 does not show a lid for the gelato tray 4, a lid can be added. The cuboid container 40 has a front wall 42, a right wall 43, a rear wall 44, a left wall 45, and a bottom 46.

The laminate 1 performs as packing for food in the temperature that range from negative-seventy-nine (i.e., dry ice) to two-hundred-four degrees Centigrade (−79-204° C.). The laminate 1 performs after sustained exposure in the ranges from −40° C. (I.e., blast freeze) to −18° C. (i.e., conventional freezer) and −18° C. to 104° C. (microwaving water=100° C.) and 4° C. (refrigerator) to 104° C. The laminate 1 performs as packaging during short exposure (i.e., two days or less, most likely less than one day) to −79° C. is possible.

In a first embodiment, the gelato tray 4 is made from the laminate 1 that has been molded to the shape. The coating 11 of the laminate 1 faces an interior of the rounded cuboid container 40. In the first preferred embodiment, the base layer 10 is made from polylactic acid (PLA), where the PLA is corn based.

In a second preferred embodiment of the gelato tray 4, the base layer 10 is made of cellulose acetate propionate (CAP). The CAP can be soy based, tree based, or grass based (e.g., bamboo).

The container 2, the steaming tray 3, and the gelato tray 4 are formed by thermoforming, compression molding, injection molding, extruding, additive manufacturing, and/or splitting, cutting, gluing, and coating sheets of the laminate 1.

A preferred embodiment of the composition is polypropylene. An alternate preferred embodiment is polyethylene. The resin is used to form the preferred embodiments of the utensils shown in FIGS. 6-10 and the containers shown in FIGS. 11-17.

Figure 6:
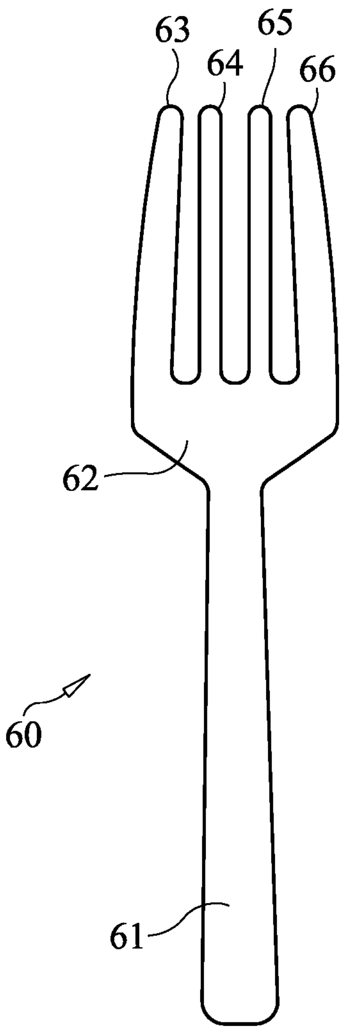
FIG. 6 is a top elevational view of a fork according to the invention.

FIG. 6 shows a preferred embodiment of a fork 60. The fork 60 includes a handle 61 connected to a root 62. Four tines 63, 64, 65, 66 extend from the root 62.

Figure 7:
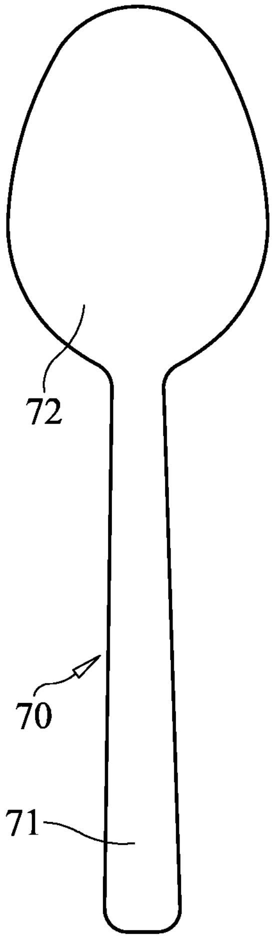
FIG. 7 is a top elevational view of a spoon according to the invention.

FIG. 7 shows a preferred embodiment of a spoon 70. The spoon 70 includes a handle 71 connected to a bowl 72.

Figure 8:
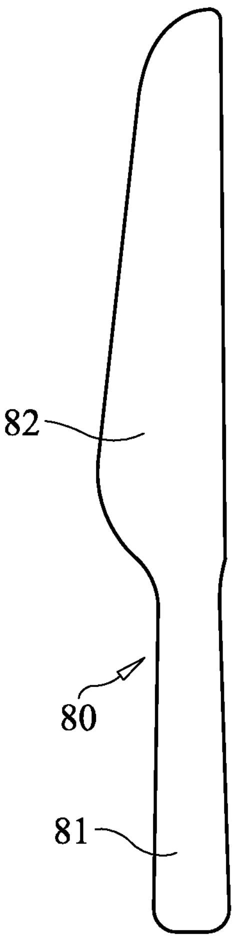
FIG. 8 is a top elevational view of a knife according to the invention.

FIG. 8 shows a preferred embodiment of a knife 80. The knife 80 includes a handle 81 connected to a knife blade 82.

Figure 9:
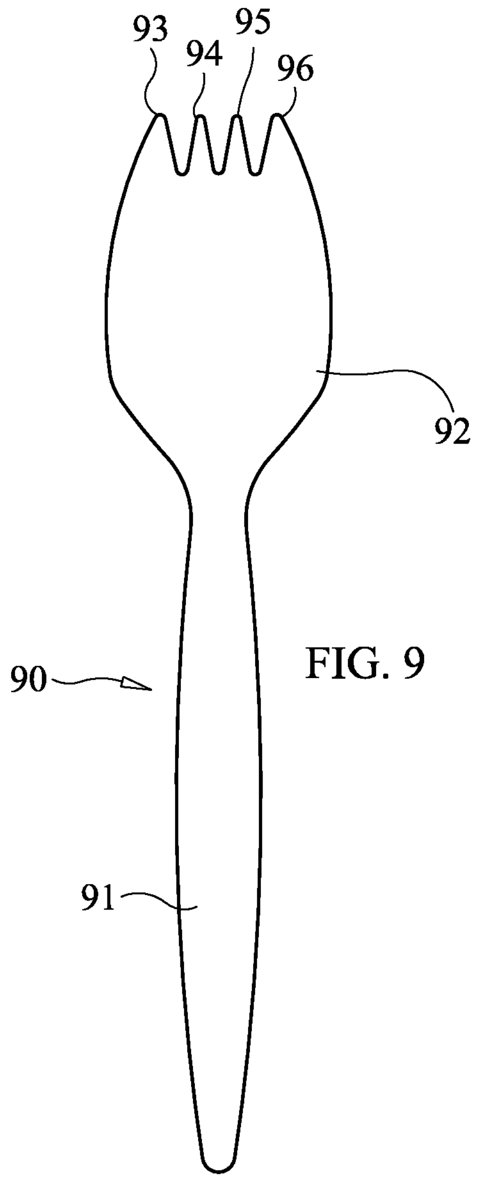
FIG. 9 is a top elevational view of a spork according to the invention.

FIG. 9 shows a preferred embodiment of a spork 90. The spork 90 includes a handle 91 connected to a bowl 92. Four tines 93, 94, 95, and 66 extend from the bowl 92.

Figure 10:
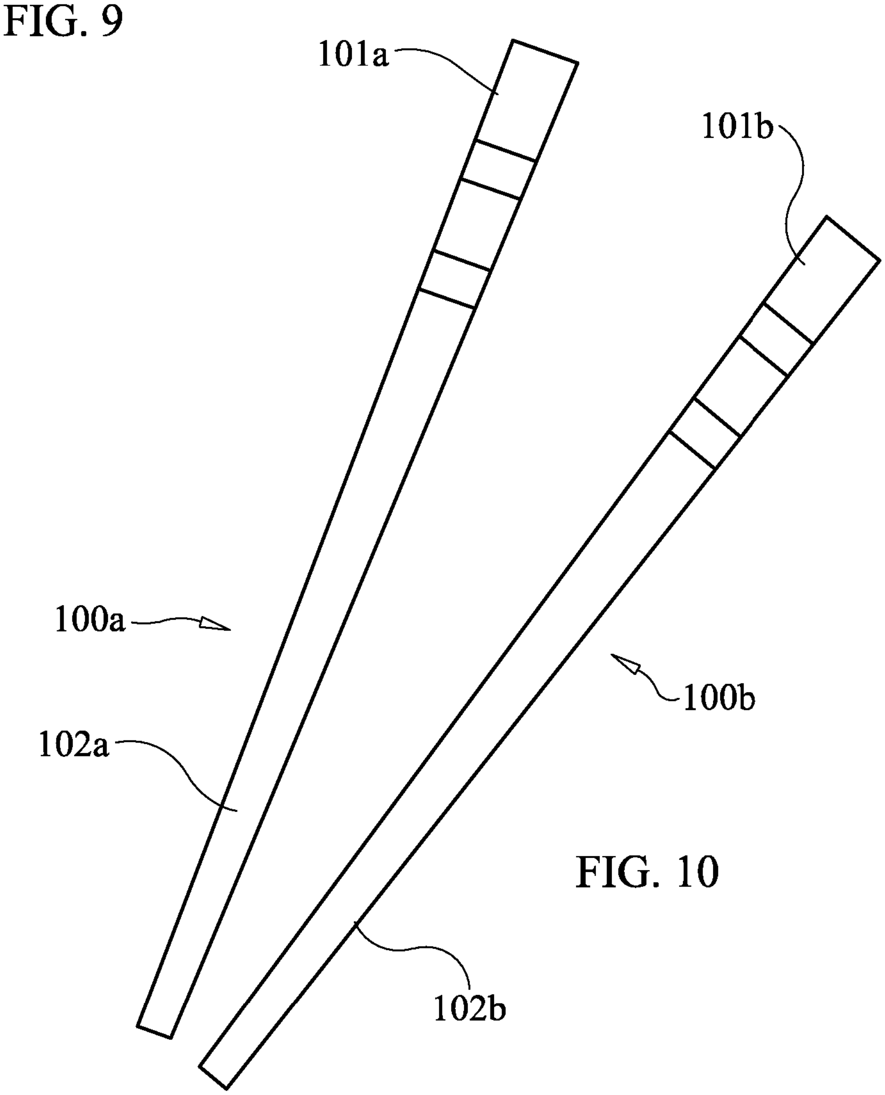
FIG. 10 is a side elevational view of a pair of chopsticks according to the invention.

FIG. 10 shows a pair of chopsticks: i.e., chopstick 100A and chopstick 100B. Each chopstick 100A and 100B has a handle 101A and 101B, respectively. From each handle 101A and 101B, a stick 102A and 102B extends, respectively.

Figure 11:
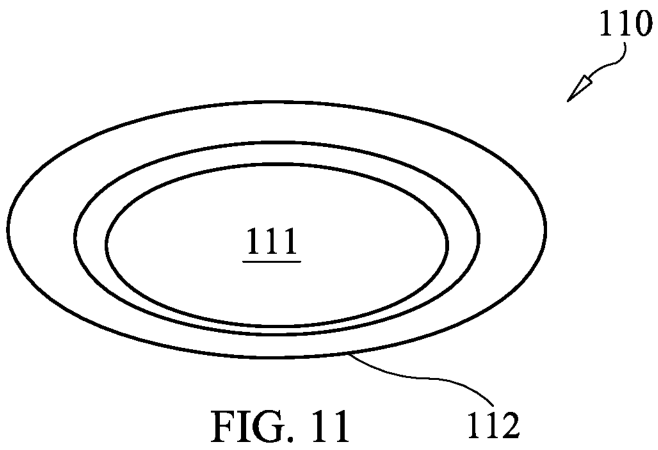
FIG. 11 is a top perspective view of a plate according to the invention.

FIG. 11 shows a plate 110. The plate 110 has a well surface 111 for supporting food and a base 112 for contacting a tabletop.

Figure 12:
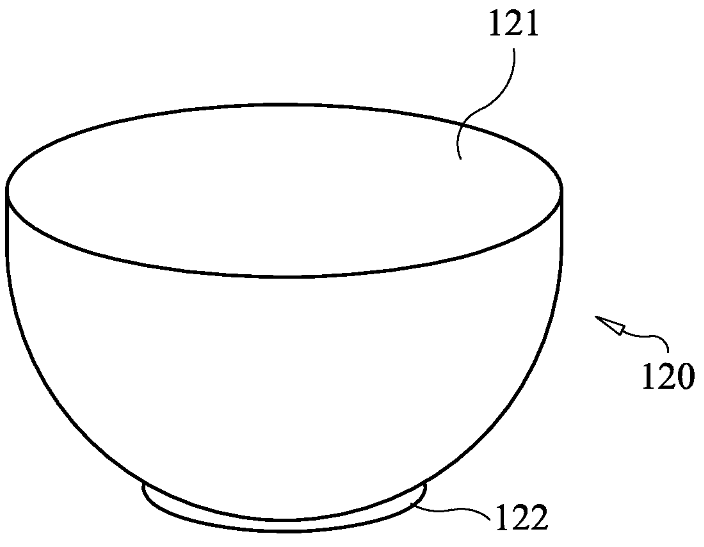
FIG. 12 is a top perspective view of a bowl according to the invention.

FIG. 12 shows a bowl 120 having a concave wall 121 for holding food and a base 122 for contacting a tabletop.

Figure 13:
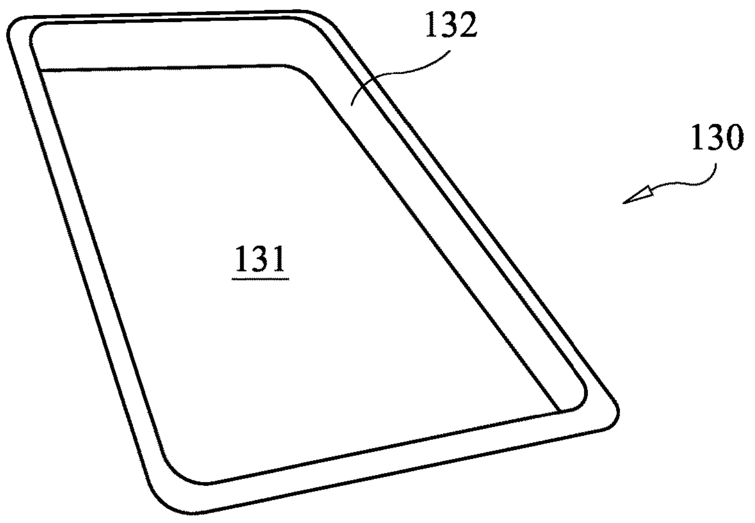
FIG. 13 is a top perspective view of a tray according to the invention.

FIG. 13 shows a tray 130. The tray 130 has a flat top 131 for supporting food or a further container. The tray 130 has a base, which is not shown, for contacting a tabletop. A rim 132 is disposed around and extends upward from the flat top 131. The rim 132 prevents spills from escaping the tray 130.

Figure 14:
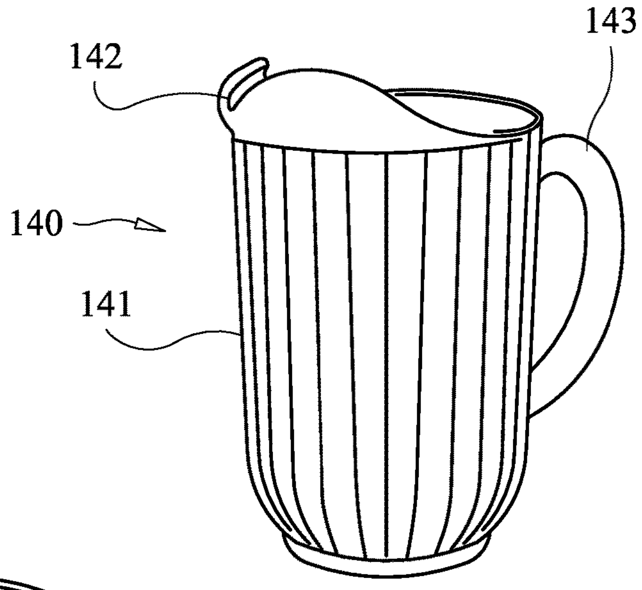
FIG. 14 is a top left perspective view of a pitcher according to the invention.

FIG. 14 shows a pitcher 140. The pitcher 140 includes a bowl 141 for storing a liquid. A user pours liquid from the bowl 141 with the spout 142. A handle connects to the bowl 141 and is used for lifting and tilting the bowl 141.

Figure 15:
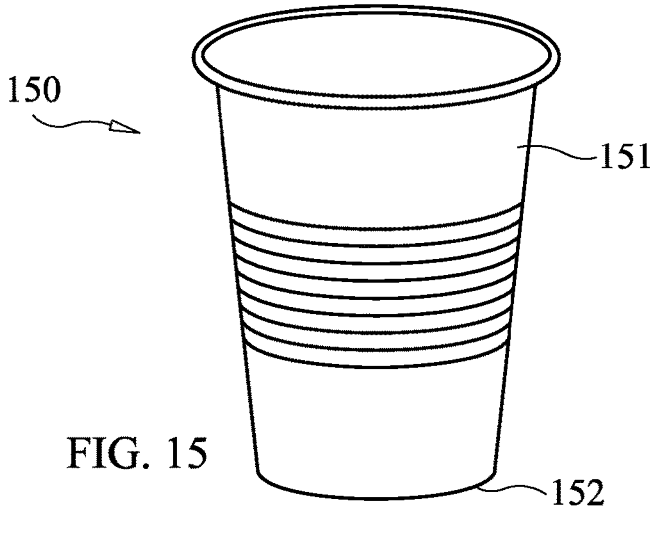
FIG. 15 is a top perspective view of a pitcher according to the invention.

FIG. 15 shows a cup 150. The cup including a frustoconical bowl 151 for storing a liquid and a base 152 for contacting a tabletop or other surface.

Figure 16:
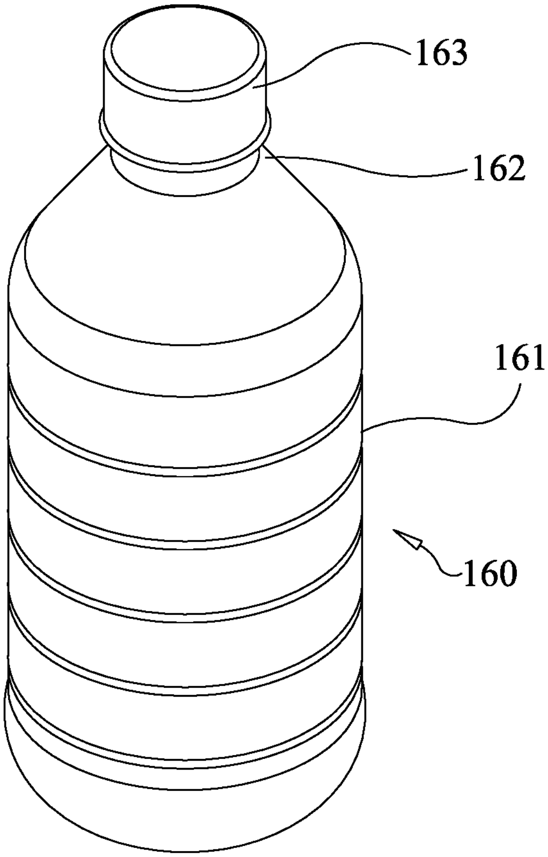
FIG. 16 is a top perspective view of a bottle according to the invention.

FIG. 16 shows a bottle 160. The bottle 160 has a bowl 161 for storing a liquid and a neck 162 with a mouth, which is not visible in FIG. 16. The neck 162 is connected to the bowl 161 and is narrower than the bowl 161. The mouth allows liquids to be added to the bowl 161 or removed from the bowl 161.

Figure 17:
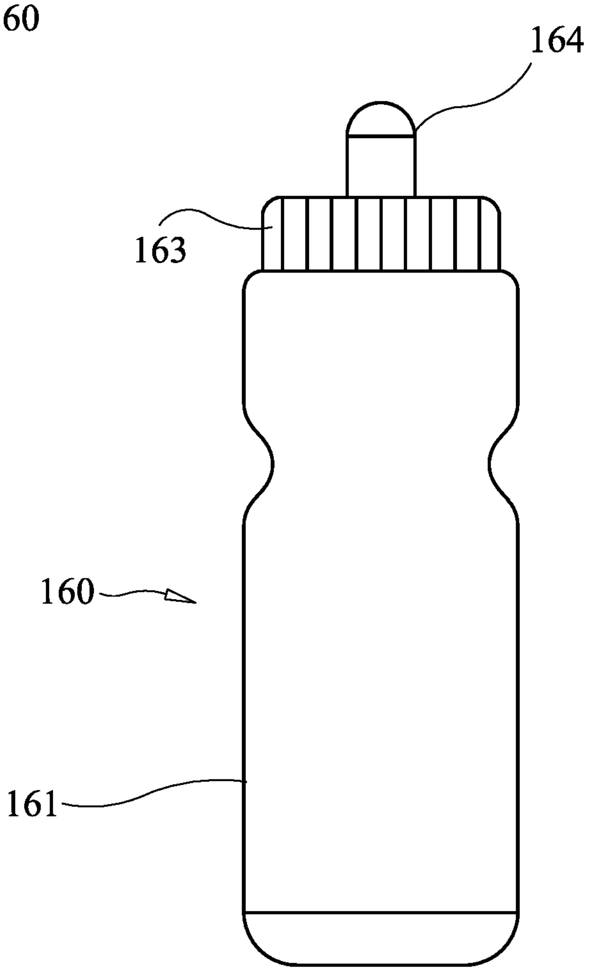
FIG. 17 is a side elevational view of a sport bottle according to the invention.

FIG. 17 shows a bottle 160. The bottle 160 has a bowl 161 for storing, a liquid and a neck 162. In the embodiment shown in FIG. 17, the bowl 161 is flexible. The cap 163 has a nozzle 164 for ejecting the liquid therethrough when the bowl 161 is squeezed.

A preferred embodiment of a method for forming a renewably-sourced biodegradable polyolefin utensil, includes the following steps.

Mixing pelletized renewably-sourced polyolefin and pelletized biodegrading agent to form a mixture.

Melting the mixture of renewably-sourced polyolefin and biodegrading agent to form a molten resin by heating the mixture to 160° C.

Injecting the molten resin into a mold with a cavity having a shape of a utensil to form a utensil.

Opening the mold to release the utensil from the mold.

Cooling the utensil to harden the molten resin in the shape of the utensil.

A preferred embodiment of a method for forming a renewably-sourced biodegradable polyolefin container, includes the following steps.

Mixing pelletized renewably-sourced polyolefin and pelletized biodegrading agent to form a mixture.

Melting the mixture of renewably-sourced polyolefin and biodegrading agent to form a molten resin by heating the mixture to 160° C.

Injecting the molten resin into a mold with a cavity having a shape of a container to form a utensil.

Opening the mold to release the container from the mold.

Cooling the container to harden the molten resin in the shape of the container.

While the embodiments show examples of the invention, the scope of the invention should not be limited to those examples, but rather set by scope of the entire specification and claims.

What is claimed is:

1. A method for packaging frozen food, which comprises:

providing a renewably-sourced biodegradable polyolefin container for carrying hot or cold food, said renewably-sourced biodegradable polyolefin container including a vessel, said vessel including a resin being made from a polymerized mixture including a renewably-sourced polyolefin and a biodegrading agent including hydrophilic parameters for increasing hydrophilicity of said polymerized mixture and increasing hydrolysis, acidogenesis, acetogenesis, and methanogenesis of said polymerized mixture;

placing food to be stored while frozen into said vessel; and cooling said renewably-sourced biodegradable polyolefin container and said food to a temperature of zero degrees Celsius or less.

2. The method according to claim 1, which further comprises:

further cooling said renewably-sourced biodegradable polyolefin container and said food to a temperature of negative seventy-eight degrees or less.

3. The method according to claim 1, which further comprises:

after the cooling, heating said renewably-sourced biodegradable polyolefin container and said food to at least twenty-five degrees Celsius.

4. The method according to claim 1, which further comprises:

after the cooling, heating said renewably-sourced biodegradable polyolefin container and said food to at least one-hundred degrees Celsius.

5. The method according to claim 1, which further comprises:

after the cooling, heating said renewably-sourced biodegradable polyolefin container and said food with microwaves.

6. A method for cooking food, which comprises:

providing a package of food, said package including a renewably-sourced biodegradable polyolefin container for carrying hot or cold food, said renewably-sourced biodegradable polyolefin container including a vessel, said vessel including a resin being made from a polymerized mixture including a renewably-sourced polyolefin and a biodegrading agent including hydrophilic parameters for increasing hydrophilicity of said polymerized mixture and increasing hydrolysis, acidogenesis, acetogenesis, and methanogenesis of said polymerized mixture, said vessel containing said food; and heating said package of food with microwaves.

* * * * *